United States Patent
Faheem et al.

(10) Patent No.: US 7,790,133 B2
(45) Date of Patent: Sep. 7, 2010

(54) MULTI-COMPONENT HYDROGEN STORAGE MATERIAL

(75) Inventors: Syed A. Faheem, Huntley, IL (US);
Gregory J. Lewis, Santa Cruz, CA (US);
J.W. Adriaan Sachtler, Des Plaines, IL (US); John J. Low, Schaumburg, IL (US); David A. Lesch, Hoffman Estates, IL (US); Paul M. Dosek, Joliet, IL (US);
Christopher M. Wolverton, Evanston, IL (US); Donald J. Siegel, Ann Arbor, MI (US); Andrea C. Sudik, Canton, MI (US); Jun Yang, Canton, MI (US)

(73) Assignees: UOP LLC, Des Plaines, IL (US); Ford Global Technologies, LLC, Dearborn, MI (US)

( * ) Notice: Subject to any disclaimer, the term of this patent is extended or adjusted under 35 U.S.C. 154(b) by 597 days.

(21) Appl. No.: 11/748,656

(22) Filed: May 15, 2007

(65) Prior Publication Data

US 2008/0286196 A1    Nov. 20, 2008

(51) Int. Cl.
*C01B 21/00* (2006.01)
*C01B 21/06* (2006.01)
*C01B 3/02* (2006.01)
*C01B 3/00* (2006.01)

(52) U.S. Cl. .................... 423/351; 423/413; 423/648.1; 423/658.2; 502/400; 429/13

(58) Field of Classification Search ................. 502/400; 423/351, 413, 644–658.5, 248, 409; 429/17, 429/13

See application file for complete search history.

(56) References Cited

U.S. PATENT DOCUMENTS

2008/0241613 A1* 10/2008 Kelly et al. .................... 429/17
2008/0274033 A1* 11/2008 Meisner et al. ............. 423/413

OTHER PUBLICATIONS

Lewis et al. "High throughput screening of the ternary LiNH2-MgH2-LiBh4 phase diagram", Journal of Alloys and Compounds 446-447 (2007) 355-359: Available online Apr. 8, 2007.*
Yang et al. "Hydrogen Storage properties of 2LiNH2 + LiBH2 + MgH2", Journal of Alloys and Compounds 446-447 (2007) 345-349: Available online Apr. 5, 2007.*
Bogdanovic and Schwickardi *J. Alloys and Comp.*, 1997, 253-254, 1-9.
Chen et al. Nature, 2002, 420, 302.
Xiong et al., Adv. Mater., 2004, 16, 1522.
Leng et al., J. Phys. Chem. B, 2004, 108, 8763.
Xiong et al, J. Alloys and Compounds, 2005, 398, 235.
Vajo et al. Chem Phys. B Letters, 109, 3719.

\* cited by examiner

*Primary Examiner*—Steven Bos
*Assistant Examiner*—Anthony J Zimmer
(74) *Attorney, Agent, or Firm*—Frank S Molinaro

(57) ABSTRACT

A reversible hydrogen storage composition having an empirical formula of:

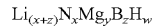

$$Li_{(x+z)}N_xMg_yB_zH_w$$

where $0.4 \leq x \leq 0.8$; $0.2 \leq y \leq 0.6$; $0 < z \leq 0.4$, $x+y+z=1$ and "w" varies from 0 to $2x+2y+4z$. This composition shows greater low temperature reversible hydrogen storage compared to binary systems such as $MgH_2$—$LiNH_2$.

9 Claims, No Drawings

MULTI-COMPONENT HYDROGEN STORAGE MATERIAL

GOVERNMENT RIGHTS

This invention was made with Government support under Contract No. DE-FC36-04GO14013 awarded by the Department of Energy. The government has certain rights in this invention.

FIELD OF THE INVENTION

The present invention relates to a composition for reversibly storing hydrogen. The composition has an empirical formula of:

$$Li_{(x+z)}N_xMg_yB_zH_w$$

where $0.4 \leq x \leq 0.8$; $0.2 \leq y \leq 0.6$; $0 < z \leq 0.4$, $x+y+z=1$ and "w" has a value from 0 to about $2x+2y+4z$.

BACKGROUND OF THE INVENTION

As the world's supply of fossil fuels dwindles, the search for energy resources to compliment and eventually replace fossil fuels has commenced. There are many options, including biofuels, nuclear power, wind power, solar power, and hydrogen. While all of these options are being developed, hydrogen is particularly attractive, especially in terms of environmental impact. Combustion of hydrogen only produces water, not the greenhouse gases that result from the combustion of biofuels or the dangerous wastes that result from nuclear fission. While hydrogen may be derived from natural gas or fossil fuel feedstocks, water is an abundant and obvious hydrogen resource. The technical hurdles that need to be cleared to realize a hydrogen economy include energy efficient production and storage of hydrogen. Hydrogen production issues may involve several technologies, including using vast arrays of solar cells for large scale hydrogen production via electrolysis of water or generating hydrogen via thermolytic cracking of water in nuclear power plants.

The current application focuses on the storage aspect of the problem. On a weight basis, hydrogen contains a great deal of energy, but on a volume basis it is inefficient. In gaseous form, hydrogen may be pressurized, but the tanks needed to maintain the high pressures required to have enough fuel for a hydrogen powered vehicle are prohibitively heavy. Another option is to liquefy the hydrogen, but the temperatures required are very low and use up about ⅓ of the stored energy in the hydrogen just for the refrigeration. Another approach that has been investigated recently is storing hydrogen in complex metal hydrides. The density of hydrogen that can be achieved in these materials is often higher than that observed for either pressurized gas systems or liquid hydrogen systems. Complex metal hydrides have been considered for utility in hydrogen storage applications for many years, but many fail to clear the hurdles presented by reversibility and high gravimetric capacity. $La_5NiH_6$ is widely used because of its excellent ability to reversibly absorb and desorb hydrogen, but with a gravimetric capacity of only 1.7 wt % hydrogen, it would be too heavy to use in vehicular applications. Other complex hydrides, such as the alanates, have good hydrogen storage capacities, up to 9 wt. %, but initially were not found to operate under practical conditions with respect to temperature and pressure. A landmark paper by Bogdanovic and Schwickardi (*J. Alloys and Comp.*, 1997, 253-254, 1-9) showed that Ti-doped $NaAlH_4$, could operate reversibly under 200° C. at reasonable pressures with nearly a 5 wt. % hydrogen storage capacity, close to the theoretical maximum of 5.5 wt. % for that material. Chen et al. found that the $LiNH_2/LiH$-based systems could be decomposed in one step to $Li_2NH$ or two steps to yield $Li_3N$, yielding 6.5 and 10.4 wt. % hydrogen, respectively (See Chen et al., Nature, 2002, 420, 302). High operating temperatures in excess of 300° C. are required to realize the higher hydrogen capacity. The $LiNH_2$ system has been extended to include $MgH_2$ in several ways, both by looking at reactions based on mixtures of 2 $LiNH_2$ and $MgH_2$ (See Xiong et al., Adv. Mater., 2004, 16, 1522) or via swapping the hydride for the amide in the starting materials, $Mg(NH_2)_2+2$ LiH (Leng et al., J. Phys. Chem. B, 2004, 108, 8763; Xiong et al., J. Alloys and Compounds, 2005, 398, 235). These systems operate at lower temperatures than the $LiNH_2/LiH$ systems. It is generally thought that the reversible hydrogen storage reactions in this system is:

$$Mg(NH_2)_2 + 2LiH \leftrightarrow Li_2Mg(NH)_2 + 2H_2$$

which yields about a 5.5 wt. % theoretical hydrogen storage capacity. Another hydrogen storage system based on 2 $LiBH_4$ and $MgH_2$ has been proposed by Vajo et. al. (see J. Chem Phys. B Letters, 2005, 109, 3719). This system is said to destabilize $LiBH_4$ via the formation of $MgB_2$ in the dehydrided form and reversibly stores up to 10 wt. % hydrogen, but the operating temperature is well over 300° C. Pinkerton et al. reported a new material derived from 2 $LiNH_2$ and $LiBH_4$ which yielded >10 wt. % hydrogen when heated over 250° C., but was not reversible. It was suggested that this material was $Li_3BH_4(NH_2)_2$, but further work has shown that this material is likely $Li_4BH_4(NH_2)_3$ (Pinkerton et al.).

Applicants have developed a ternary system of $LiBH_4$—$MgH_2$—$LiNH_2$ which can reversibly store up to nearly 4 wt. % hydrogen at temperatures below 220° C. These compositions show greater low temperature reversible hydrogen storage compared to binary systems such as $MgH_2$—$LiNH_2$.

SUMMARY OF THE INVENTION

One embodiment of the invention comprises a reversible hydrogen storage composition having an empirical formula of:

$$Li_{(x+z)}N_xMg_yB_zH_w$$

where $0.4 \leq x \leq 0.8$; $0.2 \leq y \leq 0.6$; $0 < z \leq 0.4$ and "w" varies from 0 to $2x+2y+4z$ and $x+y+z=1$.

Another embodiment of the invention is a method of preparing the reversible hydrogen composition described above comprising forming a reaction mixture comprising amide and hydride sources of Li, Mg and B and milling the mixture under an inert atmosphere for a time sufficient to form the reversible hydrogen storage composition.

Yet another embodiment of this invention is producing a hydrogen stream by taking the above described composition and heating it at a temperature of about 150° C. to about 250° C. to provide a hydrogen stream.

DETAILED DESCRIPTION OF THE INVENTION

As stated the present invention relates to a composition which can reversibly store hydrogen, a process for preparing the composition and a process for generating a hydrogen stream using the composition. The reversible hydrogen storage composition is represented by the empirical formula:

$$Li_{(x+z)}N_xMg_yB_zH_w \quad (1)$$

where $0.4 \leq x \leq 0.8$; $0.2 \leq y \leq 0.6$; $0 < z \leq 0.4$, $x+y+z=1$ and "w" varies from 0 to about $2x+2y+4z$. When w=0, the composition is fully dehydrided and when w=$2x+2y+4z$, the composition is fully hydrided.

This hydrogen storage composition is prepared from amide and hydride sources of Li, Mg and B. Sources include but are not limited to $LiNH_2$, $MgH_2$, $LiBH_4$, $Mg(NH_2)_2$, $LiH$, $Li_2NH$, $Mg(BH_4)_2$, $MgNH$, $Li_3N$, $LiMgN$, $Li_2Mg(NH)_2$, $Mg(NH_2)_2$, $LiH$ and $BH_3NH_3$. Preferred sources for the preparation of the composition are $LiNH_2$, $MgH_2$ and $LiBH_4$. In this case a reaction mixture is formed having the empirical formula of:

$$(LiNH_2)_x(MgH_2)_y(LiBH_4)_z \qquad (2)$$

where x, y and z have the same values as in equation (1).

The composition of equation (1) is prepared by forming a reaction mixture of the desired sources and in particular the sources and ratios of equation (2) and then milling the mixture under an inert atmosphere for a time of about 10 to 120 minutes. Examples of inert atmospheres include without limitation nitrogen, argon, etc. At the end of the milling, the produced composition is separated from the milling media.

The compositions of this invention reversibly bind hydrogen and thus can be used in any process requiring a source of hydrogen. The composition as obtained above is hydrided and thus can release desorbable hydrogen under appropriate conditions. Hydrogen desorption conditions for the materials of this invention include heating the material to a temperature ranging from about 150° C. to about 250° C. Although more hydrogen can be extracted by heating these materials to higher temperatures, this can damage the reversible nature of the material. The dehydrided material can be regenerated under hydrogen pressure ranging from atmospheric pressure to 68,948 kPa (10,000 psig) $H_2$ and preferably from 1,379 kPa (200 psig) $H_2$ to 13,789 kPa (2,000 psig) $H_2$ at temperatures from about 75° C. to about 250° C., and a time of about 1 minute to about 16 hours, and preferably from about 5 minutes to about 2 hours. The amount of time necessary to release substantially all the hydrogen depends on the temperature but generally varies from 1 hour to 12 hours.

It has been found that the compositions of the invention have a reversible hydrogen storage capacity of about 4 wt. % at operating temperatures below 220° C. and have capacities over 7 wt. % at higher temperatures. The hydrogen stream can be flowed to supply hydrogen to various processes including a fuel cell for generating power either for a vehicle or to generate electricity.

The following examples are set forth to illustrate the invention and are not intended as undue limitations on the generally broad scope of the invention as set out in the appended claims.

EXAMPLE 1

A combinatorial investigation of the $LiNH_2$—$MgH_2$—$LiBH_4$ system was carried out in which the compositions $(LiNH_2)_x(MgH_2)_y(LiBH_4)_z$ were prepared, where x, y, and z were varied from 0 to 1 in 0.1 increments with the constraint that x+y+z=1. The samples were prepared on a 1.5 g scale, using appropriate amounts of $LiNH_2$ (95%), $MgH_2$ (98%), and $LiBH_4$ (95%). All synthetic manipulations and measurements were carried out under a nitrogen atmosphere usually in a glove box. Appropriate amounts of the $LiNH_2$, $MgH_2$, and $LiBH_4$ powders were added to a 45 ml tungsten carbide milling bowl containing 18-10 mm tungsten carbide balls. After the addition of the powders, the milling bowls were closed and sealed with parafilm, transferred from the glove box to a planetary ball mill and the samples were milled at 350 rpm for 15 minutes in each direction. The samples were transferred back to the glove box when milling was completed.

For measurement of the hydrogen storage capacity, the samples were then transferred to another glove box which contained a reactor which could measure the hydrogen capacity of 8 samples simultaneously. The sample loading was about 0.5 g. The measurement started with a hydriding cycle as the samples were exposed to hydrogen at 125° C. for 12 hr at 8,618 kPa (1,250 psig) $H_2$. This was followed by a desorption cycle, during which the pressure of the hydrogen evolved was measured as the temperature was ramped to 220° C. at 2° C./min, (the results denoted in the table below as first desorption), the measured pressures being converted to weight percent hydrogen for each sample. To establish reversibility, the samples were then rehydrided at 125° C.; 8,618 kPa (1,250 psig) $H_2$, for 12 hr, as before. This was followed by a second desorption, carried out under the same conditions as the first desorption. The measured hydrogen content from the second desorption is considered to be the reversible hydrogen contained within each composition investigated. For each of the compositions investigated, the hydrogen observed in the first and second desorptions are given in Table 1 below.

TABLE 1

Hydrogen Storage Capacities of $LiNH_2$—$MgH_2$—$LiBH_4$ Compositions

| moles LiNH2 | Moles LiBH4 | moles MgH2 | wt %-Cycle 1 | wt %-Cycle 2 (reversible) |
|---|---|---|---|---|
| 0.2 | 0.8 | 0 | 0.3 | 0.2 |
| 0.3 | 0.7 | 0 | 0.3 | 0.3 |
| 0.4 | 0.6 | 0 | 0.5 | 0.2 |
| 0.5 | 0.5 | 0 | 1.3 | 0.7 |
| 0.6 | 0.4 | 0 | 1.1 | 0.6 |
| 0.7 | 0.3 | 0 | 0.8 | 0.4 |
| 0.8 | 0.2 | 0 | 0.6 | 0.3 |
| 0.9 | 0.1 | 0 | 0.1 | 0.1 |
| 0.1 | 0.8 | 0.1 | 0.9 | 0.3 |
| 0.2 | 0.7 | 0.1 | 1.1 | 0.9 |
| 0.3 | 0.6 | 0.1 | 1.2 | 1.0 |
| 0.4 | 0.5 | 0.1 | 1.3 | 1.0 |
| 0.5 | 0.4 | 0.1 | 1.3 | 1.1 |
| 0.6 | 0.3 | 0.1 | 1.5 | 1.4 |
| 0.7 | 0.2 | 0.1 | 2.0 | 1.7 |
| 0.8 | 0.1 | 0.1 | 1.4 | 1.0 |
| 0.9 | 0 | 0.1 | 0.2 | 0.1 |
| 0.1 | 0.7 | 0.2 | 1.4 | 0.5 |
| 0.2 | 0.6 | 0.2 | 1.5 | 0.1 |
| 0.3 | 0.5 | 0.2 | 2.1 | 1.4 |
| 0.4 | 0.4 | 0.2 | 2.4 | 2.1 |
| 0.5 | 0.3 | 0.2 | 2.7 | 2.1 |
| 0.6 | 0.2 | 0.2 | 2.8 | 2.6 |
| 0.7 | 0.1 | 0.2 | 2.8 | 2.2 |
| 0.8 | 0 | 0.2 | 0.3 | 0.1 |
| 0.1 | 0.6 | 0.3 | 1.2 | 0.3 |
| 0.2 | 0.5 | 0.3 | 2.3 | 0.7 |
| 0.3 | 0.4 | 0.3 | 2.6 | 0.4 |
| 0.4 | 0.3 | 0.3 | 2.9 | 1.4 |
| 0.5 | 0.2 | 0.3 | 3.5 | 2.6 |
| 0.6 | 0.1 | 0.3 | 3.7 | 3.4 |
| 0.7 | 0 | 0.3 | 0.5 | 0.2 |
| 0.1 | 0.5 | 0.4 | 1.2 | 0.2 |
| 0.2 | 0.4 | 0.4 | 2.5 | 0.6 |
| 0.3 | 0.3 | 0.4 | 2.5 | 0.3 |
| 0.4 | 0.2 | 0.4 | 3.5 | 0.5 |
| 0.5 | 0.1 | 0.4 | 4.2 | 1.2 |
| 0.6 | 0 | 0.4 | 1.3 | 0.5 |
| 0.1 | 0.4 | 0.5 | 1.4 | 0.1 |
| 0.2 | 0.3 | 0.5 | 3.0 | 0.2 |
| 0.3 | 0.2 | 0.5 | 2.8 | 1.1 |
| 0.4 | 0.1 | 0.5 | 3.4 | 0.6 |
| 0.5 | 0 | 0.5 | 1.3 | 0.4 |
| 0.1 | 0.3 | 0.6 | 1.4 | 0.1 |

TABLE 1-continued

Hydrogen Storage Capacities of LiNH$_2$—MgH$_2$—LiBH$_4$ Compositions

| moles LiNH2 | Moles LiBH4 | moles MgH2 | wt %-Cycle 1 | wt %-Cycle 2 (reversible) |
|---|---|---|---|---|
| 0.2 | 0.2 | 0.6 | 3.0 | 0.1 |
| 0.3 | 0.1 | 0.6 | 3.9 | 0.3 |
| 0.4 | 0 | 0.6 | 2.0 | 0.5 |
| 0.1 | 0.2 | 0.7 | 1.4 | 0.1 |
| 0.2 | 0.1 | 0.7 | 2.8 | 0.1 |
| 0.3 | 0 | 0.7 | 1.8 | 0.4 |
| 0.1 | 0.1 | 0.8 | 0.4 | 0.0 |
| 0.2 | 0 | 0.8 | 1.2 | 0.3 |
| 0.1 | 0 | 0.9 | 0.8 | 0.1 |
| 0 | 0.1 | 0.9 | 0.0 | 0.0 |
| 0 | 0.2 | 0.8 | 0.1 | 0.0 |
| 0 | 0.3 | 0.7 | 0.0 | 0.0 |
| 0 | 0.4 | 0.6 | 0.0 | 0.0 |
| 0 | 0.5 | 0.5 | 0.0 | 0.0 |
| 0 | 0.6 | 0.4 | 0.0 | 0.0 |
| 0 | 0.7 | 0.3 | 0.0 | 0.0 |
| 0 | 0.8 | 0.2 | 0.0 | 0.0 |

EXAMPLE 2

The formulation 5LiNH$_2$:2.2MgH$_2$:LiBH$_4$ was prepared by combining 1.191 g LiNH$_2$ (95%), 0.582 g MgH$_2$ (98%), and 0.226 g LiBH$_4$ (95%) in a 45 ml tungsten carbide milling bowl with 18-10 mm tungsten carbide balls. The procedure for the synthesis and the hydrogen capacity measurement is the same as setforth in example 1. On the first desorption the material contained 3.89 wt. % hydrogen upon desorption to 220° C. After rehydriding, the material showed a reversible capacity of 3.41 wt. % hydrogen.

EXAMPLE 3

Binary compositions were prepared according to literature references and compared to the ternary composition from example 2 and the 0.6LiNH$_2$:0.3MgH$_2$:0.1 LiBH$_4$ ternary composition from the combinatorial study in example 1. The compositions are given in Table 2 along with the hydrogen storage capacities. For this set of samples, the measurements used a 200° C. rehydriding temperature and 8,618 kPa (1,250 psig) H$_2$ for 12 hr. The same conditions were employed for desorption, the complete cycle being 200° C. hydride-220° C. desorb-200° C. hydride-220° C. desorb. The hydrogen storage capacities and reversibility shown for the ternary materials are superior to the binary compositions in the literature for this low temperature operation.

TABLE 2

| Composition | | Cycle 1 | Cycle 2 |
|---|---|---|---|
| 2 LiNH$_2$:MgH$_2$ | Chen | 0.49% | 0.50% |
| 2 LiBH$_4$:MgH$_2$ | Vajo | 0.0 | 0.0 |

TABLE 2-continued

| Composition | | Cycle 1 | Cycle 2 |
|---|---|---|---|
| 2 LiNH$_2$:LiBH$_4$ | Pinkerton | 0.23% | 0.20% |
| 0.6 LiNH$_2$:0.3 MgH$_2$:0.1 LiBH$_4$ | Ex. 1 | 3.81% | 3.37% |
| 5 LiNH$_2$:2.2 MgH$_2$:LiBH$_4$ | Ex. 2 | 3.38% | 3.29% |

What is claimed is:

1. A reversible hydrogen storage composition having an empirical formula of:

$$Li_{(x+z)}N_xMg_yB_zH_w$$

where $0.4 \leq x \leq 0.8$; $0.2 \leq y \leq 0.6$; $0 \leq z \leq 0.4$ and w varies from 0 to $2x+2y+4z$; and wherein $x+y+z=1$.

2. The composition of claim 1 where w has a value of $2x+2y+4z$.

3. The composition of claim 1 where w has a value of 0.

4. A process for preparing a reversible hydrogen storage composition having an empirical formula of:

$$Li_{(x+z)}N_xMg_yB_zH_w$$

where $0.4 \leq x \leq 0.8$; $0.2 \leq y \leq 0.6$; $0 < z \leq 0.4$ and w varies from 0 to $2x+2y+4z$ and wherein $x+y+z=1$; the process comprising forming a reaction mixture comprising amide and hydride sources of Li, Mg and B and milling the mixture under an inert atmosphere for a time sufficient to form the reversible hydrogen storage composition.

5. The process of claim 4 where the sources of Li, Mg and B are selected from the group consisting of Li$_2$NH, LiNH$_2$, MgH$_2$, Mg(BH$_4$)$_2$, Li$_3$N, LiMgN, Li$_2$Mg(NH)$_2$, Mg(NH$_2$)$_2$, LiH and BH$_3$NH$_3$.

6. The process of claim 4 where the reaction mixture has a composition represented by an empirical formula of:

$$(LiNH_2)_x(MgH_2)_y(LiBH_4)_z$$

where $0.4 \leq x \leq 0.8$; $0.2 \leq y \leq 0.6$; $0 < z \leq 0.4$ and $x+y+z=1$.

7. A process for generating a hydrogen stream comprising taking a hydrided reversible hydrogen storage composition having an empirical formula of:

$$Li_{(x+z)}N_xMg_yB_zH_w$$

where $0.4 \leq x \leq 0.8$; $0.2 \leq y \leq 0.6$; $0 < z \leq 0.4$ and w varies from greater than 0 to $2x+2y+4z$ and wherein $x+y+z=1$ and heating to a temperature from about 150° C. to about 250° C. thereby releasing hydrogen and providing a dehydrided composition.

8. The process of claim 7 further comprising taking the dehydrided composition and hydriding it by treating it with hydrogen at a temperature of about 75° C. to about 250° C., a pressure of about atmospheric to about 68,948 kPa of hydrogen for a time of about 1 minute to about 16 hours.

9. The process of claim 7 further comprising passing the hydrogen stream to a fuel cell to generate power.

* * * * *